Oct. 30, 1934.  H. L. BLUM  1,978,928
METHOD AND APPARATUS FOR TREATING LIQUIDS
Filed July 29, 1932   2 Sheets-Sheet 1
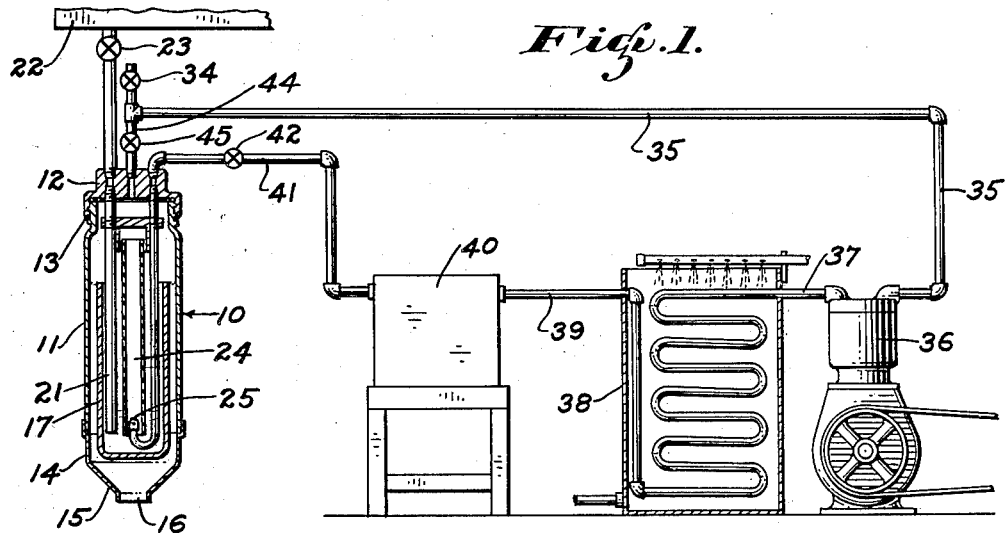
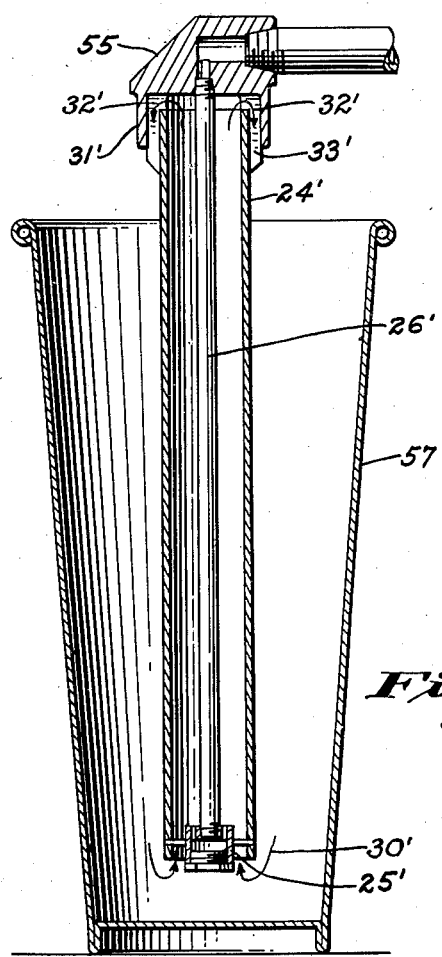
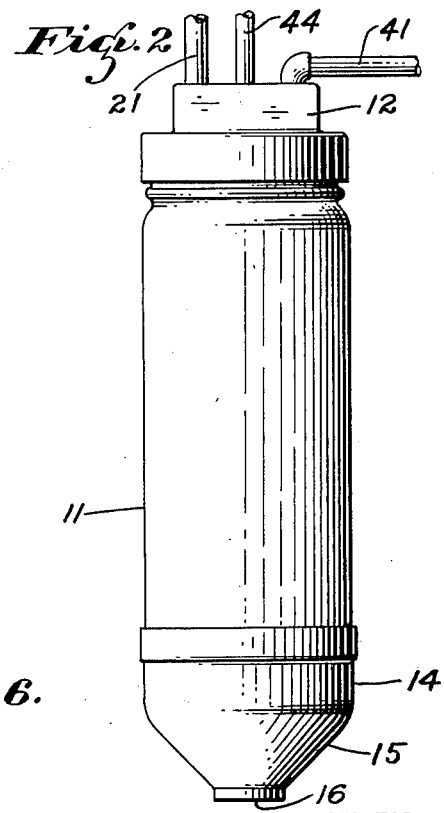
INVENTOR.
Hosmer L. Blum
BY
ATTORNEYS.

Oct. 30, 1934.   H. L. BLUM   1,978,928
METHOD AND APPARATUS FOR TREATING LIQUIDS
Filed July 29, 1932   2 Sheets-Sheet 2
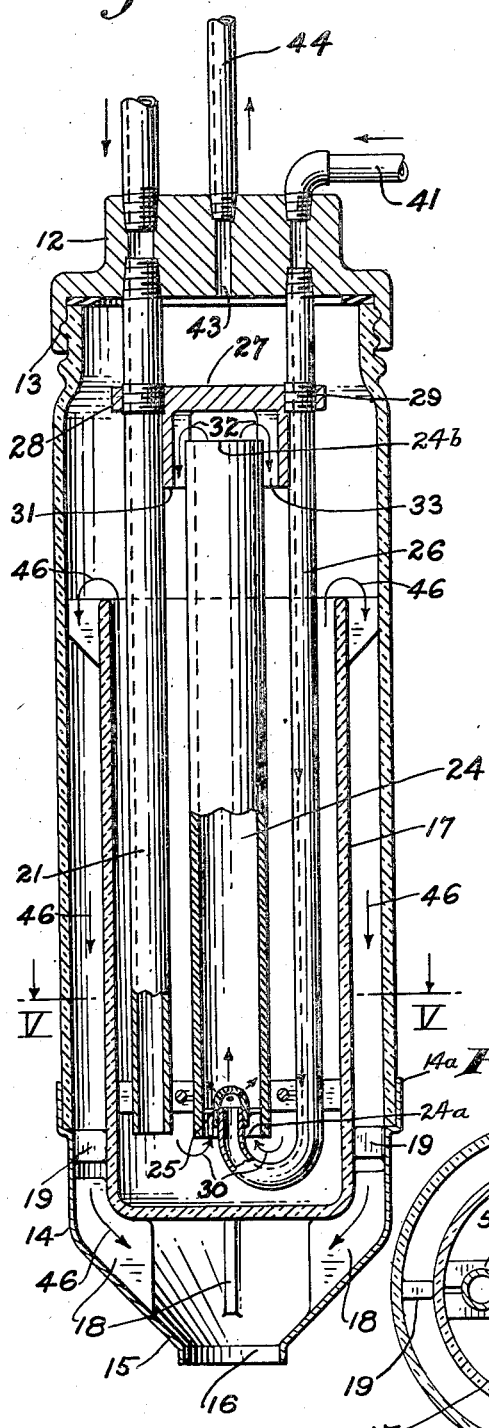
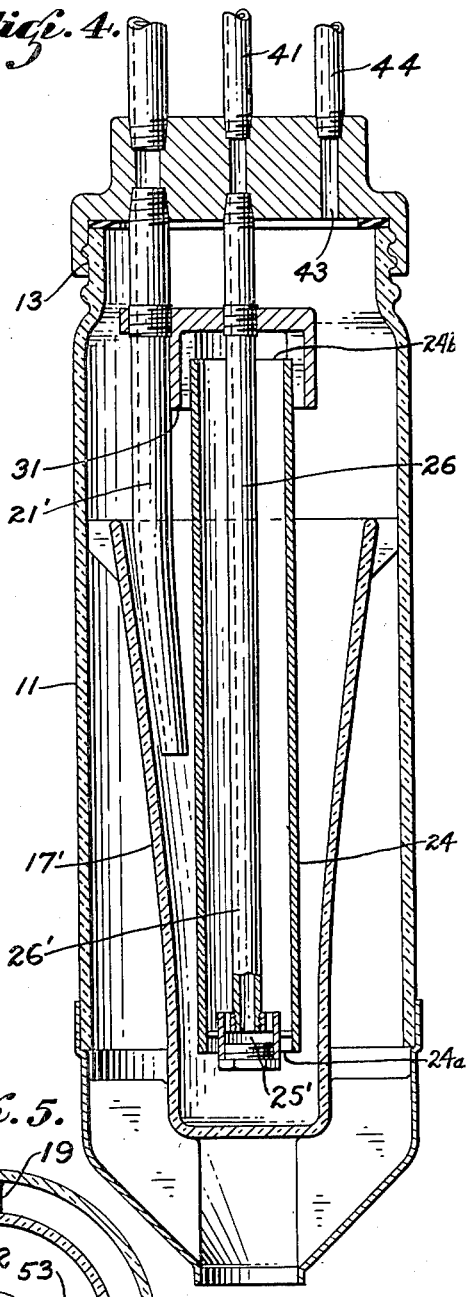
INVENTOR.
Hosmer L. Blum.
BY
ATTORNEYS.

Patented Oct. 30, 1934

1,978,928

UNITED STATES PATENT OFFICE 1,978,928

METHOD AND APPARATUS FOR TREATING LIQUIDS

Hosmer L. Blum, San Francisco, Calif.

Application July 29, 1932, Serial No. 626,041

11 Claims. (Cl. 62—174)

This invention relates to a method and apparatus for treating potable liquids by aeration, and more particularly to a method and apparatus whereby potable liquids may be aerated and refrigerated, and, if desired, during a continuous flow.

It is one object of this invention to provide a novel method and apparatus for agitating and aerating potable liquids.

Another object is to provide a novel method and apparatus for cooling or congealing liquids.

Another object is to provide a novel method and apparatus for simultaneously agitating, aerating and cooling or congealing liquids.

Another object is to provide a method and apparatus that shall operate by flotation to produce a continuous supply of finished aerated edible product from a source of liquid or mixture to be treated.

Another object is to provide a method and apparatus for treating a liquid mixture, wherein air is employed for simultaneously agitating, aerating and cooling or congealing said mixture.

Another object is to provide a method and apparatus having the above characteristics, wherein air is employed for lifting the liquid from a container, and wherein the liquid is aerated and returned to the same container.

A further object is to provide a method and apparatus having the above characteristics, wherein air is expanded in the presence of a liquid mixture to be treated for simultaneously agitating, aerating and cooling such liquid.

A still further object is to provide a method and apparatus having the above characteristics, that shall be simple, efficient in operation, readily assembled and disassembled for sterilizing, inspection and repair, and comparatively cheap of manufacture.

The above and other objects will be made apparent throughout the further description of the method and apparatus, when taken in connection with the accompanying drawings, wherein like reference characters refer to like parts. It is to be distinctly understood that the drawings are not a definition of the invention, but are merely one form of an apparatus for carrying out the present method, the invention being defined by the appended claims.

In the drawings:—

Fig. 1 is a diagrammatic view, partly in section, of one form of the apparatus embodying the invention.

Fig. 2 is an enlarged detail view, in elevation, embodying the invention.

Fig. 3 is an axial sectional view of Fig. 2.

Fig. 4 is a view similar to Fig. 3, showing a different embodiment of the invention.

Fig. 5 is a sectional view taken on the line 5—5 of Fig. 3, and

Fig. 6 is an axial sectional view of a device showing still another embodiment of the invention.

Referring to the drawings, Figs. 1 to 3 and 5 inclusive illustrate one form of an apparatus for carrying out the present method.

In this embodiment of the invention, which includes simultaneously agitating, aerating and cooling a liquid or mixture to be treated, the method and apparatus will be described in connection with the making of ice cream, sherbets, potable beverages and the like.

In the form shown, 10 indicates, in it entirety, an agitating, aerating and cooling device, which device consists of a cylindrical housing 11, having a head block or top member 12. The top 12 may be connected to the upper end of the cylindrical housing 11 by any suitable means, such as threaded means 13. The lower end of the housing 11 is provided with a bottom member 14, which may be removably mounted as by annular collar 14a, and which terminates in an inwardly flared reduced portion 15, provided with an opening 16 in the bottom thereof, through which the treated liquid is expelled from the device 10.

Within the cylindrical housing 10, and preferably positioned concentrically thereof, is a container 17 having a closed bottom and open at its top. The container 17 may be supported within the housing 11 by means of spaced fins or supporting members 18, the latter being preferably carried by the bottom portions 14 and 15 of the housing 11.

For the purpose of anchoring the container 17 in rigid fixed relation within the housing 11, suitable positioning lugs 19 may be provided in spaced relation around the outer surface of the container 17, and adapted to engage and cooperate with the corresponding inner surface of the housing 11.

The liquid to be treated is supplied to the lower portion of the container 17 by way of a conduit or supply pipe 21; the supply pipe 21 being connected with a supply tank or container 22 (see Fig 1). A suitable valve 23 is provided in the supply line for regulating the supply of the liquid to the container 17.

Means for simultaneously lifting, aerating and cooling the liquid is provided within the container 17, and consists of a vertically disposed tube 24, extending from a point adjacent the bottom of the container 17 upwardly and terminating at a predetermined distance above the top of the container 17, the tube 24 having an open lower inlet end 24a and an open upper outlet end 24b. The liquid to be aerated and cooled is supplied to the lower portion of the container 17 by way of the conduit 21, and its course of circulation is a cycle upwardly through the tube 24, out of the top thereof, and thence deflected back into the container 17 by the skirted hood 27. This cycle of circulation is effected through the medium of expanding a jet of compressed air or other gaseous fluid within the tube 24 adjacent the bottom thereof, the flow of air being directed upwardly, and creating a suction which draws liquid from the bottom of the container through opening 24a to be atomized by the jet of air from upwardly directed nozzle 25, the tube 24 providing a confined expansion chamber for the atomization and aeration of the liquid.

Air is supplied to an expansion nozzle 25 by way of a conduit or air line 26, the air being supplied from any suitable source, such as a compressor unit 36, and delivered to the expansion nozzle 25 at a suitable predetermined pressure and temperature, the characteristics of the expansion nozzle being of suitable type for effecting the required air expansion, to effectively reduce the temperature thereof.

The upward force of the expanding air within the tube 24 will set up a violent suction at the open lower end 24a of the tube 24, as indicated by the arrows 30, this suction operating to lift the liquid from the bottom of the container 17 upwardly through opening 24a of the tube 24, during which time the liquid is thoroughly aerated, atomized and broken up into minute globules, the latter being intimately subjected to the reduced temperature of the chilled air.

Positioned within the housing 11 and spaced from the top thereof, as well as from the upper open end 24b of tube 24, is provided a deflector or hood member 27 which may be mounted on the conduits 21 and 26 by means of threaded connections, as shown at 28 and 29 respectively. Depending from the bottom of the hood 27 is an annular flange or skirt 31, which extends below the opening of the upper end of tube 24, and serves to return to container 17 the fluid which is atomized and aerated in the tube 24, as indicated by arrows 32.

The interior diameter of the annular flange 31 is greater than the exterior diameter of the tube 24, the upper end of the latter being supported in spaced relation within the annular flange 31 by means of spaced fins 33 which may be carried by the tube 24 and adapted to snugly and slidably fit within the annular flange 31.

The operation of the device is as follows. (See Fig. 1).

Air is supplied through the intake valve 34 by way of a conduit 35, to a suitable compressor unit 36, the latter operating to compress the air to a predetermined pressure, after which the air is conveyed, by way of the conduit 37, through a suitable air cooler 38 for reducing the air to the required temperature, after which the air is conveyed by way of the conduit 39 to an air filter 40 in which the air is conditioned for delivery to the expansion nozzle 25 by way of the conduit 41, in which a suitable valve 42 is provided for regulating the flow of the air through the expansion nozzle 25.

A vent 43 is provided in the top 12 of the housing 11, the latter being connected with the conduit 35 by way of the conduit 44, whereby the surplus used air is returned to the compressor 36, this salvaged air being pre-cooled, and also of importance in the saving effected in substitution of carbonated gas in place of air. The conduit 44 is provided with a valve 45 for closing the conduit 44 and retaining the used air within the housing 11 for the purpose of creating a pressure within the housing 11 for forcing out any liquids which may become congealed to such a degree that it will not flow over the top of the container 17, down the side walls between the container 17 and housing 11, and out the bottom of the opening 16, as indicated by the arrows 46.

It is now obvious from the above, that the liquid to be treated is supplied from the supply tank 22 to the lower area of the container 17, where it flows into the lower open end of tube 24 and is lifted through the tube 24 by means of the suction action of the expanding air, during which time it is intimately subjected to the reduced temperature of the air jet, and circulated out of the top of the tube 24 and thence deflected back into the container 17 by means of the skirted hood 27. This operation continues until the liquid is properly aerated, agitated and cooled, and may be continued as a cycle until the fluid reaches a freezing point which still permits a ready flow thereof, or what may be termed a semi frozen condition. The aerated portion of the liquid will rise to the top of the liquid body in container 17, thus permitting the more fluid liquid to settle to the bottom to again be subjected to refrigerated aeration. In this manner, by continuous operation of the apparatus and process, there is continuously being formed at the top of the liquid in container 17, an aerated and refrigerated froth which continuously increases to the full capacity of container 17, after which time it flows over the top edge of the container 17, and flows downwardly, as indicated by the arrows 46, out of the opening 16 and into a container for such disposition as may be desired, as the placing of the finished product into an intensely refrigerated hardening room, if complete congelation is desired, or the delivery of the product to a customer, if mere aeration and cooling are desired. The overflow will be augmented also in the degree that additional liquid is supplied through feed conduit 21.

The degree of aeration and cooling of the liquid may be regulated by increasing or decreasing the rate at which the liquid to be treated is supplied to the container 17, and the amount of air supplied to the expansion nozzle 25.

Fig. 4 illustrates a slightly different embodiment of the invention, which consists of the shape of the container 17', the latter being provided with a reduced bottom portion, having the side walls thereof flared outwardly and upwardly. The latter structure operates to more directly supply the incoming liquid to be treated to the suction at the bottom of the tube 24, and prevents splash from the liquid deflected downwardly by hood 27.

Fig. 5 illustrates one form of a means for positioning and anchoring the lower ends of the conduits 21 and 26 and tube 24, which means may be a pair of oppositely disposed members 49 of sufficient length to engage the corresponding internal side walls of the container 17, and having recesses 51, 52 and 53 for receiving and clamping the lower ends of the conduit 21, tube 24 and conduit 26 respectively in rigid fixed relation within the container 17.

Fig. 6 illustrates still another embodiment of the invention which is here described in connection with the agitating, aerating and cooling of cold drinks, such as malted milk, milk shakes, carbonated beverages and the like. In this embodiment, a head member 55 is provided having depending therefrom an annular flange or apron 31', the latter being adapted to support the tube 24' in substantially the same manner as that described in connection with the tube 24 and annular flange 31. The fins 33' which may be carried by the tube 24' are adapted to slidably fit within the annular flange 31' and adapted to support the upper end of the tube 24' in spaced relation to the annular flange 31' and the bottom of the head member 55.

Compressed air is supplied to the expansion valve 25' by way of the conduit 26', the latter extending downwardly through the tube 24' and preferably concentrically thereof.

The operation of the latter embodiment consists in placing a liquid to be treated in the container 57, then in placing the tube 24' within the container 57, and then in supplying air to the nozzle 25 for circulating the liquid through the tube 26 and back into the container 57 by way of the apron or annular flange 31'. This operation continues until the proper agitation, aeration and cooling is obtained.

There is thus provided a novel method and apparatus for treating liquids wherever the operation of agitation, aeration and cooling is required. The present device is simple in structure, absent of any movable parts, efficient in operation, readily accessible for sterilization, inspection and repair, durable and adaptable for use wherever the agitation and cooling of liquids may be required.

While there is but certain forms of the invention illustrated and described, it will be understood by those skilled in the art that various changes, modifications, substitutions, additions and omissions may be made in the method and apparatus herein described without departing from the spirit and scope of the invention, as defined by the appended claims.

I claim:—

1. The method of making a congealed edible confection which consists in the steps of providing a liquid body in a container, inducing a cycle of flow of liquid from a lower portion of the liquid body, and returning said liquid flow to the upper portion of the liquid body, subjecting said liquid to a refrigerated aeration treatment in transit and removing refrigerated and aerated liquid from the upper level of the liquid body.

2. The method of making a congealed edible confection which consists in the steps of providing a liquid body in a container, inducing a cycle of flow of said liquid from a lower portion of the liquid body, refrigerating and aerating said flow of liquid by subjecting said liquid in transit to a jet of refrigerated expanding gaseous fluid, interrupting the direction of said flow and returning the refrigerated and aerated liquid to the upper level of the liquid body responsive to the unexpended force of induced cycle of flow, and removing refrigerated and aerated fluid from the upper portion of the liquid body.

3. A flotation method of continuous manufacture of frozen edible products from liquid material, which consists in providing a continual feed supply within a body of liquid and providing within said body of liquid a confined course of liquid flow having an inlet below the top of the liquid level and outlet above the top of the liquid level, and inducing a cycle of flow of liquid through the confined course including subjecting said liquid to an aeration and refrigeration treatment by a jet of refrigerated compressed air within said confined course, returning the aerated and refrigerated liquid from the outlet of the confined course to the upper level portion of the main liquid body responsive to the unexpended force of the induced cycle of flow, and inducing an overflow from the top of the main liquid body responsive to the combined continual liquid feed and to froth formation from the aeration treatment.

4. A method of preparing an edible confection which consists in supplying a liquid mixture to the lower portion of a container, in inducing a flow of said liquid from said container to a point above the top level of the liquid body in said container, in subjecting said liquid to a refrigerated aeration treatment during said flow, in returning said liquid to said container responsive to the velocity of the induced flow, and removing the liquid from the upper level of the liquid body in the container.

5. The method of making a congealed edible confection by a continuous flow which consists in supplying a liquid mixture to a container, in inducing a flow of said liquid to a point above the liquid level in said container by subjecting said liquid during said flow to the action of a jet of compressed gaseous refrigerated fluid, in returning said treated liquid to said container responsive to the force of the induced flow thereof, and then in forcing the refrigerated aerated froth formed on the top of said liquid over the upper edges of said container and into a second container responsive to supplying additional liquid mixture into the container.

6. The method of continuously making a congealed edible confection which consists in continuously supplying a liquid mixture to the lower portion of a container, in inducing a flow of said liquid from said lower portion to a point above the liquid level in the container by subjecting the said liquid during said induced flow to the action of fluid of such reduced temperature as to refrigerate the liquid flow to a condition of substantial congelation in returning the refrigerated liquid to the upper level of the liquid in the container and then continuously transferring the congealed liquid from said container to another container responsive to the continuity of supplying liquid to the container.

7. An apparatus for aerating and refrigerating potable liquids comprising the combination with refrigerating mechanism, of an aeration apparatus including a container adapted to receive a liquid to be treated, a head block, a tubular expansion chamber having an inlet opening adapted for positioning adjacent the bottom of the container, and an outlet opening adjacent the head block, a tubular conduit for a compressed gaseous fluid having an outlet nozzle within the lower portion of the tubular expansion chamber and directed toward the outlet opening, a deflector member overlying the outlet opening and adapted to deflect liquid from the outlet opening of the tube into the container, the said tubular expansion chamber, conduit and nozzle, and deflector being connected to the head block, and the said elements being arranged and positioned to provide an unobstructed path for return of liquid from the deflector to the container, means for lifting said liquid from said container and cooling said liquid during the lifting operation, and means for returning the treated liquid to said container.

8. An apparatus for refrigerating and aerating potable liquids including, in combination with a refrigerating apparatus, a device comprising a housing having an opening in its lower portion, a container within said housing having an open top, said container being supported in spaced relation within said housing providing a passageway exterior of the container and communicating with the said opening in the lower portion of the housing, a tube within said container having an opening at each end, said tube extending from a point adjacent the bottom of said container to a point above the top of said container, a deflector member adjacent and overlying the upper open end of said tube, and means cooperating with the refrigerating apparatus for supplying a refrigerated gaseous fluid under pressure to the lower end of said tube.

9. An apparatus for refrigerating and aerating potable liquids including, in combination with a refrigerating apparatus a device comprising a housing having an opening in its lower portion, a container within said housing having an open top, said container being supported in spaced relation within said housing providing a passageway exterior of the container and communicating with the said opening in the lower portion of the housing, a tube within said container having an opening at each end, said tube extending from a point adjacent the bottom of said container to a point above the top of said container, a deflector member adjacent and overlying the upper open end of said tube, and means cooperating with the refrigerating apparatus for supplying a refrigerated gaseous fluid under pressure to the lower end of said tube, said last mentioned means including a nozzle having its discharge orifice within the lower portion of the tube and directed longitudinally of the tube toward the deflector member.

10. An apparatus for preparing an edible confection from a liquid mixture which is fluid at normal temperatures and congeals upon refrigeration, comprising a housing having an outlet at the lower portion thereof, a container in said housing and spaced therefrom providing a passageway leading from an upper edge of said container to the lower opening of the housing, means for inducing a flow of said liquid mixture from the lower portion of the liquid mixture in said container and for returning said flow of liquid to the upper liquid level of said container, the said means being adapted simultaneously to aerate and refrigerate the said liquid during the induced flow thereof, the return of said liquid to the container being responsive to the unexpended force imparted to the liquid by the means for inducing the flow whereby a substantially congealed froth is provided at the upper liquid level, and means to feed additional liquid mixture into a lower portion of the container whereby the congealed froth may be forced to overflow into the passageway between the container and the housing.

11. An apparatus for making an edible confection comprising a container having a closed top and an opening in its bottom, a second container having a closed bottom and an opening in its top, the said second container being disposed within the said first container and in spaced relation thereto forming a passageway between the said containers, a tube disposed in said second container, means disposed in said tube for causing a suction therethrough, means supported by the said first container and having a discharge opening adjacent to the bottom of said second container for supplying a liquid mixture, the first said means being adapted to induce a cycle or flow of said liquid upwardly through said tube, the upper end of said tube being provided with means for deflecting the liquid back into said second container whereby the said deflected liquid may overflow from the upper edges of second container and through the said passageway between the said containers.

HOSMER L. BLUM.